(12) United States Patent
Lin et al.

(10) Patent No.: US 11,942,985 B2
(45) Date of Patent: Mar. 26, 2024

(54) 10G RATE OLT TERMINAL TRANSCEIVER INTEGRATED CHIP BASED ON XGSPON WITH DFB LASER

(71) Applicant: XIAMEN EOCHIP SEMICONDUCTOR CO., LTD, Xiamen (CN)

(72) Inventors: An Lin, Xiamen (CN); Jinghu Li, Xiamen (CN); Zhang Fan, Xiamen (CN)

(*) Notice: Subject to any disclaimer, the term of this patent is extended or adjusted under 35 U.S.C. 154(b) by 0 days.

(21) Appl. No.: 18/323,362

(22) Filed: May 24, 2023

(65) Prior Publication Data
US 2023/0388010 A1 Nov. 30, 2023

(30) Foreign Application Priority Data
May 24, 2022 (CN) .......................... 202210576014.2

(51) Int. Cl.
*H04B 10/038* (2013.01)
*H04B 10/40* (2013.01)
*H04Q 11/00* (2006.01)

(52) U.S. Cl.
CPC ......... *H04B 10/038* (2013.01); *H04B 10/40* (2013.01); *H04Q 11/0067* (2013.01); *H04Q 2011/0081* (2013.01)

(58) Field of Classification Search
CPC ........ H04Q 11/0067; H04Q 2011/0081; H04B 10/038; H04B 10/40; H04B 10/25751; H04B 10/25753; H04B 10/25754; H04B 10/25758; H04B 10/43; H04B 10/60; H04B 10/50
See application file for complete search history.

(56) References Cited

U.S. PATENT DOCUMENTS

| 8,019,825 B1* | 9/2011 | Johnston | H01M 4/925 709/212 |
| 2013/0108280 A1* | 5/2013 | Azadeh | H04B 10/695 398/210 |
| 2020/0351577 A1* | 11/2020 | Valencia | H04Q 11/0067 |

FOREIGN PATENT DOCUMENTS

| CN | 102412897 A | * | 4/2012 | ............. H04B 10/12 |
| CN | 102412897 A | | 4/2012 | |
| CN | 106953696 A | | 7/2017 | |

(Continued)

*Primary Examiner* — Hibret A Woldekidan
(74) *Attorney, Agent, or Firm* — Novoclaims Patent Services LLC; Mei Lin Wong

(57) ABSTRACT

A 10G rate OLT terminal transceiver integrated chip based on XGSPON and DFB laser includes: a burst mode receiver RX which amplifies an optical signal from each ONU client into an electrical signal through a burst transimpedance amplifier TIA, processes amplitude detection, and outputs the signal whose amplitude met the threshold requirements to a host, and comprises a fast recovery module to discharge charges in an AC coupling capacitor to achieve multi-packet transmission without mutual interference, thereby meeting the timing sequence requirement of the XGSPON protocol; a continuous mode transmitter TX which receives the electrical signal attenuated by a PCB board, and selects a bypass BYPASS path or a clock data recovery CDR path for activation according to a degree of attenuation; and a digital control unit DIGIITAL which communicates with the host and provides control signals for the burst mode receiver RX and the continuous mode transmitter TX.

9 Claims, 4 Drawing Sheets

(56) References Cited

FOREIGN PATENT DOCUMENTS

| | | | |
|---|---|---|---|
| CN | 109040868 | A | 12/2018 |
| CN | 113423028 | A | 9/2021 |
| CN | 114040274 | A | 2/2022 |
| CN | 114374902 | A | 4/2022 |

* cited by examiner

10G RATE OLT TERMINAL TRANSCEIVER INTEGRATED CHIP BASED ON XGSPON WITH DFB LASER

FIELD OF INVENTION

The present invention relates to the field of integrated circuit and optical communication.

DESCRIPTION OF RELATED ARTS

In an optical communication central office equipment OLT (abbreviation for Optical Line Termination, optical line terminal), a burst LA (limiting amplifier) completes the limit amplification of the different amplitude electrical signals transmitted by the upper burst transimpedance amplifier TIA. LA also includes a LOS (Loss of Signal, loss of signal) module, which judges whether the input signal of LA meets the requirements of the transmission protocol and performs the operation of turning off or opening the main channel. The continuous LDD (Laser Diode Driver) converts the data flow of the electrical signal into a modulated current to drive the laser to emit light and transmit the optical signal. The LDD includes a threshold configuration module to cooperate with the APC (automatic optical power control) and ATC (automatic temperature control) modules to complete the feedback control of the LDD.

The passive optical network are generally divided into three specific implementation methods: APON (abbreviation of ATM-Passive Optical Network, ATM passive optical network) based on ATM transmission protocol, EPON (abbreviation of Ethernet Passive Optical Network, Ethernet wireless network) based on Ethernet Source Optical Network), and GPON (abbreviation for Gigabit-capable Passive Optical Network, Gigabit-capable Passive Optical Network) with a rate above Gbit. Among these three implementations, GPON can provide higher speed, higher access performance and network efficiency, and stronger flexibility and scalability. It can meet the bandwidth requirements of various existing and future services.

However, with the competition in the market and the advancement of the new era, it is necessary to upgrade the architecture and speed of the OLT transceiver integrated chip of the central office equipment based on GPON technology.

Therefore, in view of the above deficiencies, it is necessary to upgrade the rate of the OLT terminal based on the GPON standard so that it can meet the needs of the market and achieve low cost and high rate.

SUMMARY OF THE PRESENT INVENTION

An object of the present invention is to solve the existing low rate problem of the existing OLT terminal based on GPON standard, and provides a 10G rate OLT terminal transceiver integrated chip based on XGSPON and DFB laser.

According to the present invention, a 10G rate OLT terminal transceiver integrated chip based on XGSPON and DFB laser comprises: a burst mode receiver RX, a continuous mode transmitter TX and a digital control unit DIGIITAL.

The burst mode receiver RX amplifies an electrical signal which is originated from a burst transimpedance amplifier TIA processing an optical signal from each ONU client, and then processes amplitude detection of the electrical signal and determines if the electrical signal whose amplitude meets a threshold requirement, and output a detection result of the electrical signal to a host, and comprises a fast recovery module to discharge charges in an AC coupling capacitor to achieve multi-packet transmission without mutual interference, thereby meeting the timing sequence requirement of the XGSPON protocol.

The continuous mode transmitter TX receives the electrical signal attenuated by a PCB board, and according to the degree of attenuation, selects a bypass path BYPASS for transmission or outputs the electrical signal after the signal quality is improved through a clock data recovery CDR path to drive a DFB laser.

The digital control unit DIGIITAL communicates with the host, and is arranged to provide control signals for the burst mode receiver RX and the continuous mode transmitter TX.

Preferably, the burst mode receiver RX comprises a pre-amplifier Pre_Amplifier, a level detector LEVEL DETECTOR, a 10G burst-mode limiting amplifier BurstLA_10G, a current mode logic output buffer CML BUFFER, a signal detection output buffer BUFFER and a fast recovery module;

a non-inverting input and an inverting input of the pre-amplifier Pre_Amplifier are arranged to receive a burst data packet from the burst transimpedance amplifier TIA; the fast recovery module is arranged to provide a fast recovery circuit to ensure a timing sequence is correct, so that physical collision of two burst data packets before and after is avoided;

an output terminal of the pre-amplifier Pre_Amplifier is simultaneously connected to an input terminal of the 10G burst-mode limiting amplifier BurstLA_10G and an input terminal of the level detector LEVEL DETECTOR;

an output terminal of the 10G burst-mode limiting amplifier BurstLA_10G is connected to an input terminal of the current mode logic output buffer CML BUFFER;

an output terminal of the level detector LEVEL DETECTOR is simultaneously connected to an input terminal of the signal detection output buffer BUFFER and an on/off control terminal of the current mode logic output buffer CML BUFFER;

two output terminals of the current mode logic output buffer CML Buffer are connected to output pins RX_OUTP and RX_OUTN of the burst mode receiver RX respectively;

an output terminal of the signal detection output buffer BUFFER is connected to a chip pin RX_SD, and the burst mode receiver RX sends a detection result to the host through the chip pin RX_SD;

when a reset signal sent by a chip pin LA_RESET is received from the host, the chip sends a feedback signal to the host through the pin RX_SD.

Preferably, the fast recovery module is built-in or external to the burst mode receiver RX. The fast recovery module includes resistors R7, R8, R9, R10, and switches S1, S2;

when the fast recovery module is external to the burst mode receiver RX, a non-inverting output terminal of the burst transimpedance amplifier TIA is connected to one end of the resistor R10 of the fast recovery module, one end of the resistor R8 of the fast recovery module and a non-inverting input pin RX_INP of the chip through an AC coupling capacitor C9;

an inverting output terminal of the burst transimpedance amplifier TIA is connected to one end of the resistor R9 of the fast recovery module and one end of the resistor R7 of the fast recovery module, and an inverting input pin RX_INN of the chip through the AC coupling capacitor C8;

a non-inverting input pin RX_INP of the chip and an inverting input pin RX_INN of the chip are connected to a non-inverting input terminal and an inverting input terminal of the pre-amplifier Pre_Amplifier respectively;

another end of the resistor R10 is connected to one end of the switch S1;

another end of the resistor R9 is connected to one end of the switch S2;

control ends of the switches S1 and S2 are connected to a reset signal line LA_RESET simultaneously; and a reference voltage pin Vref of the burst mode receiver RX is simultaneously connected to another end of the resistor R7, another end of the R8, another end of the switch S1 and another end of the switch S2.

When the fast recovery module is built in the burst mode receiver RX, a non-inverting output terminal and an inverting output terminal of the burst transimpedance amplifier TIA are connected to a non-inverting input pin RX_INP and an inverting input pin RX_INN of the chip through AC coupling capacitors C9 and C8;

inside the chip, the non-inverting input pin RX_INP of the chip is connected to one end of the resistor R10, one end of the resistor R8 and a non-inverting input terminal of the pre-amplifier Pre_Amplifier;

the inverting input pin RX_INN of the chip is connected to one end of the resistor R9, one end of the resistor R7 and an inverting input of the pre-amplifier Pre_Amplifier;

another end of the resistor R10 is connected to one end of the switch S1;

another end of the resistor R9 is connected to one end of the switch S2;

control ends of the switches S1 and S2 are connected to a reset signal line LA_RESET of the chip simultaneously;

a reference voltage Vref of the burst mode receiver RX is simultaneously connected to another end of the resistor R7, another end of the R8, another end of the switch S1 and another end of the switch S2.

Preferably, the continuous mode transmitter TX comprises an input buffer Input Buffer, a bypass ByPass, a clock data recovery CDR, a DFB laser driver, a bias current control unit and a modulation current control unit, one of the bypass ByPass or the clock data recovery CDR path is selected to activate;

an attenuated signal formed by an original high-speed electrical signal passing through a metal trace on a PCB board is connected to the input buffer Input Buffer through the chip pins TX_INP and TX_INN, then the input buffer Input Buffer transmits the attenuated signal to the input terminal of the DFB laser driver along an activated path;

a bias current output terminal of the bias current control unit is connected to the chip pin BIAS, and provides a bias current for the DFB laser;

a modulation current output terminal of the modulation current control unit is connected to a modulation current input terminal of the DFB laser driver;

an output terminal of the DFB laser driver is connected to the chip pins TX_OUTP and TX_OUTN, and the DFB laser driver provides modulation current for the DFB laser;

the host sends commands to the chip to turn off the bias current and the modulation current through the chip pin TXDIS to turn off the continuous mode transmitter TX.

Preferably, the activation of one of the bypass ByPass or the clock data recovery CDR path is controlled by digital control unit Digital according to an external command.

Preferably, the activation of one of the bypass ByPass path or the clock data recovery CDR path is controlled through the host automatically switching the channel by itself, when the rate is below 8G, the signal attenuation is not serious, and the bypass ByPass is activated; when the rate is 8G-14G, the signal attenuation is serious, and the clock data recovery CDR path is activated under the control of the host.

Preferably, the digital control unit Digital comprises a register digital core, an analog-to-digital converter ADC, a I²C slave and temperature sensor Temp Sensor;

an output terminal of the temperature sensor Temp Sensor is connected to a temperature signal input terminal of the register digital core through the analog-to-digital converter ADC;

an input terminal of I²C slave is connected to a pin SCL of a clock chip; an input and output terminals of I²C slave are connected to a pin SDA of an external command chip; an output terminal of I²C slave is connected to an external command input terminal of the register digital core, and the register digital core controls a path selection of the continuous mode transmitter TX; the register digital core also realizes a configuration of the burst mode receiver RX and the continuous mode transmitter TX through a control port.

Preferably, the control port for configuring the burst mode receiver RX in the digital control unit Digital comprises an eye cross point adjustment control port CPA, an output swing control port SW CTRL, an output polarity inversion control port POL CTRL, and a signal loss control port LOS CTRL.

Preferably, the control port for configuring the continuous mode transmitter TX in the digital control unit Digital comprises an optical power control port APC, an eye cross point adjustment control port CPA, a jitter optimization control port EQ, an eye diagram optimization control port EO and an output polarity inversion control port POL CTRL;

an input terminal of the optical power control port APC is connected to a chip pin MPD for monitoring current.

The advantageous effect of the present invention: The present invention provides a circuit structure of a 10G rate OLT terminal transceiver integrated chip based on XGSPON with DFB laser. On the basis of the GPON protocol architecture, the rate is further improved, the downlink continuous data rate is increased from the basic 2.5 Gbps to 10 Gbps, and the uplink burst data rate is increased from the basic 2.5 Gbps to 10 Gbps, therefore symmetric uplink and downlink rates (Symmetric) is achieved, the upload and download rate to the ONU at the user end are greatly improved, and is compatible with the use of DFB lasers, which is much cheaper than EML lasers, for data transmission.

The present invention provides an overall framework structure of a 10G rate OLT terminal transceiver integrated chip based on XGSPON and DFB laser, which includes a 10 Gbps burst LA, a 10 Gbps continuous LD with CDR that can be turned off or turned on, a digital module to optimize eye diagram transmission quality, and a low cost DFB lasers, therefore the final cost of the transceiver integrated chip can be reduced.

DETAILED DESCRIPTION OF THE PREFERRED EMBODIMENT

Figure 1:
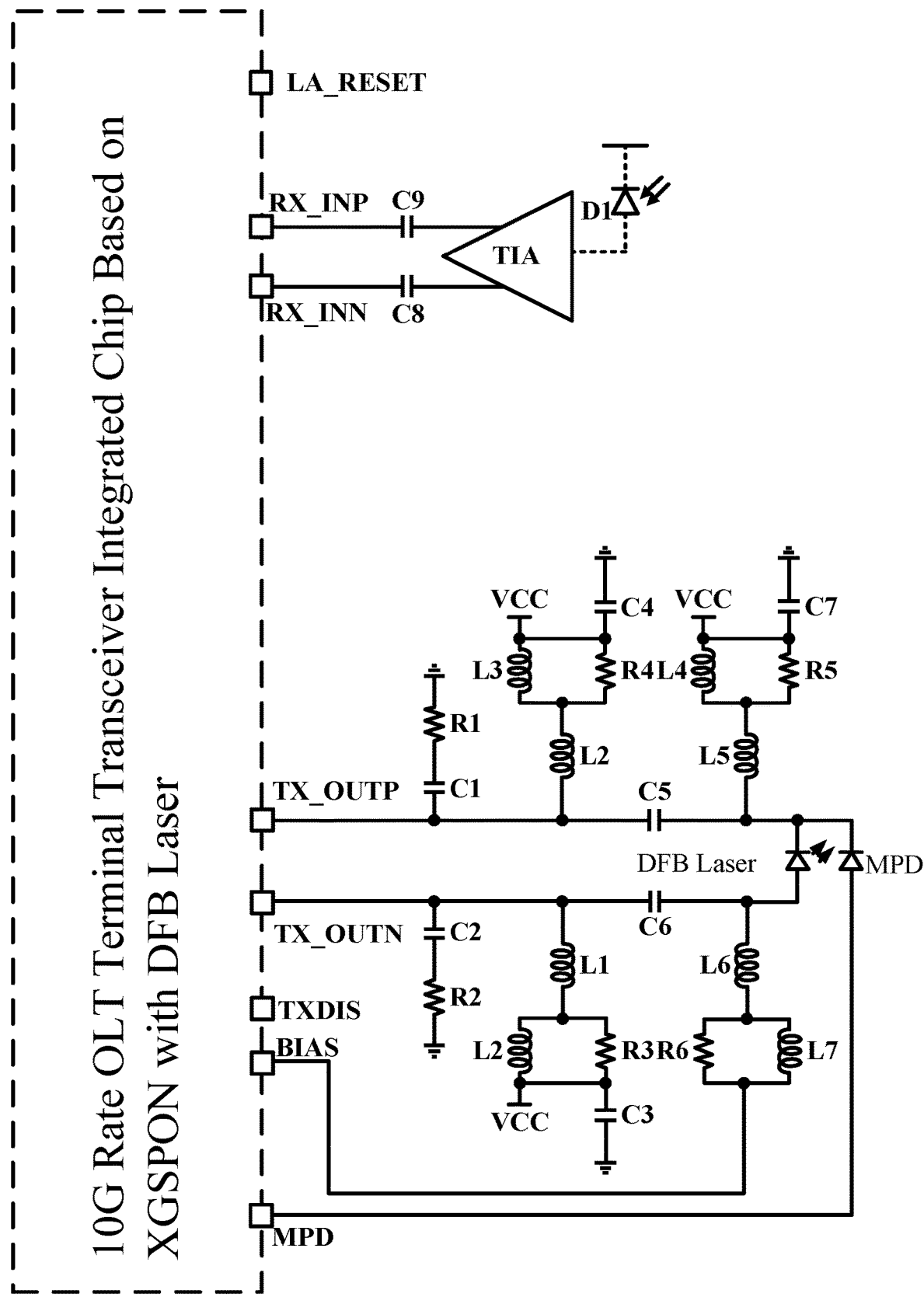
FIG. 1 is a schematic diagram based on XGSPON with DFB laser, and an external fast recovery circuit according to the present invention.

The following will clearly and completely describe the technical solutions in the embodiments of the present invention with reference to the accompanying drawings in the embodiments of the present invention. Clearly, the described embodiments are only some, not all, of the embodiments of the present invention. Based on the embodiments of the present invention, all other embodiments obtained by persons of ordinary skill in the art without creative efforts or inventive steps fall within the protection scope of the present invention.

According to the present invention, a 10G rate OLT terminal transceiver integrated chip based on XGSPON and DFB laser is provided. The fast recovery circuit in the receiver (RX) within the chip frame, the amplitude detection of the electrical signal transmitted from the TIA, the switchable start-stop clock data recovery (CDR) module in the transmitter (TX), the laser driver which is capable of driving of the DFB laser, and the modular and configurable digital part (Digital) are the keys to the realization of the present invention.

The clock data recovery module CDR in the continuous mode transmitter TX can be activated or stopped according to the quality of actual transmission eye diagram, and the DFB laser, which is much cheaper than the EML laser, is used to emit and transmit data.

In the burst mode receiver RX, the amplitude detection of the electrical signal transmitted by the upper-level TIA can be performed, and the output driver (CML Buffer) can be turned on after meeting the requirements to transmit data. In order to meet the strict timing sequence requirements of the XGSPON protocol, a fast recovery circuit is added to the periphery or inside of the chip to discharge the charges in the AC coupling capacitor to achieve multi-packet transmission without interfering with each other. The digital control unit Digital, communicates with the host through two signal lines SCL and SDA to optimize data transmission quality of RX and TX inside the OLT transceiver integrated chip.

It should be noted that as long as there is no conflict, the different embodiments or the different features in different embodiments can be combined with each other.

The present invention is further described in conjunction with accompanying drawings and specific embodiment as follows, which is not intended to be limiting.

Embodiment 1: This embodiment is described below with reference to FIGS. 1-4. According to this embodiment, a 10G rate OLT terminal transceiver integrated chip based on XGSPON and DFB laser comprises: a burst mode receiver RX, a continuous mode transmitter TX and a digital control unit DIGITAL.

A burst transimpedance amplifier TIA processes an optical signal from each ONU client into an electrical signal, the burst mode receiver RX amplifies the electrical signal and processes amplitude detection of the electrical signal, judges if an amplitude of the electrical signal meets the threshold requirements, and outputs a judgment result of the electrical signal to a host, and comprises a fast recovery module to discharge charges in an AC coupling capacitor to achieve multi-packet transmission without mutual interference, thereby meeting the timing sequence requirement of the XGSPON protocol.

The continuous mode transmitter TX receives the electrical signal attenuated by the PCB board, and according to the degree of attenuation, selects the bypass BYPASS path for transmission or outputs the signal after the signal quality is improved through the clock data recovery CDR path.

The digital control unit DIGITAL communicates with the host, and is arranged to provide control signals for the burst mode receiver RX and the continuous mode transmitter TX.

This embodiment is equipped with a DFB laser and its peripheral circuit comprises resistors R1-R6, capacitors C1-C7, inductors L1-L7 and monitoring diode MPD, wherein a monitoring current is led to the chip MPD pin through the monitoring diode MPD, which is shown in FIG. 1 of the drawings.

The burst mode receiver RX comprises a pre-amplifier Pre_Amplifier, a level detector Level Detector, a 10G burst-mode limiting amplifier BurstLA_10G, a current mode logic output buffer CML Buffer, a signal detection output buffer Buffer and a fast recovery module;

a non-inverting input and an inverting input of the pre-amplifier Pre_Amplifier are arranged to receive a burst data packet from the burst transimpedance amplifier TIA; the fast recovery module is arranged to provide a fast recovery circuit to ensure the timing sequence is correct, so that physical collision of two burst data packets before and after is avoided;

an output terminal of the pre-amplifier Pre_Amplifier is simultaneously connected to an input terminal of the 10G burst-mode limiting amplifier BurstLA_10G and an input terminal of the level detector LEVEL DETECTOR;

an output terminal of the 10G burst-mode limiting amplifier BurstLA_10G is connected to an input terminal of the current mode logic output buffer CML Buffer;

an output terminal of the level detector Level Detector is simultaneously connected to an input terminal of the signal detection output buffer Buffer and an on/off control terminal of the current mode logic output buffer CML Buffer;

two output terminals of the current mode logic output buffer CML Buffer are connected to output pins RX_OUTP and RX_OUTN of the burst mode receiver RX respectively;

an output of the signal detection output buffer Buffer is connected to a chip pin RX_SD, and the burst mode receiver RX sends a detection result to the host through the chip pin RX_SD.

When a reset signal is received by a chip pin LA_RESET from the host, the chip sends a feedback signal to the host through the pin RX_SD.

The fast recovery module is built-in or external to the burst mode receiver RX.

Figure 2:
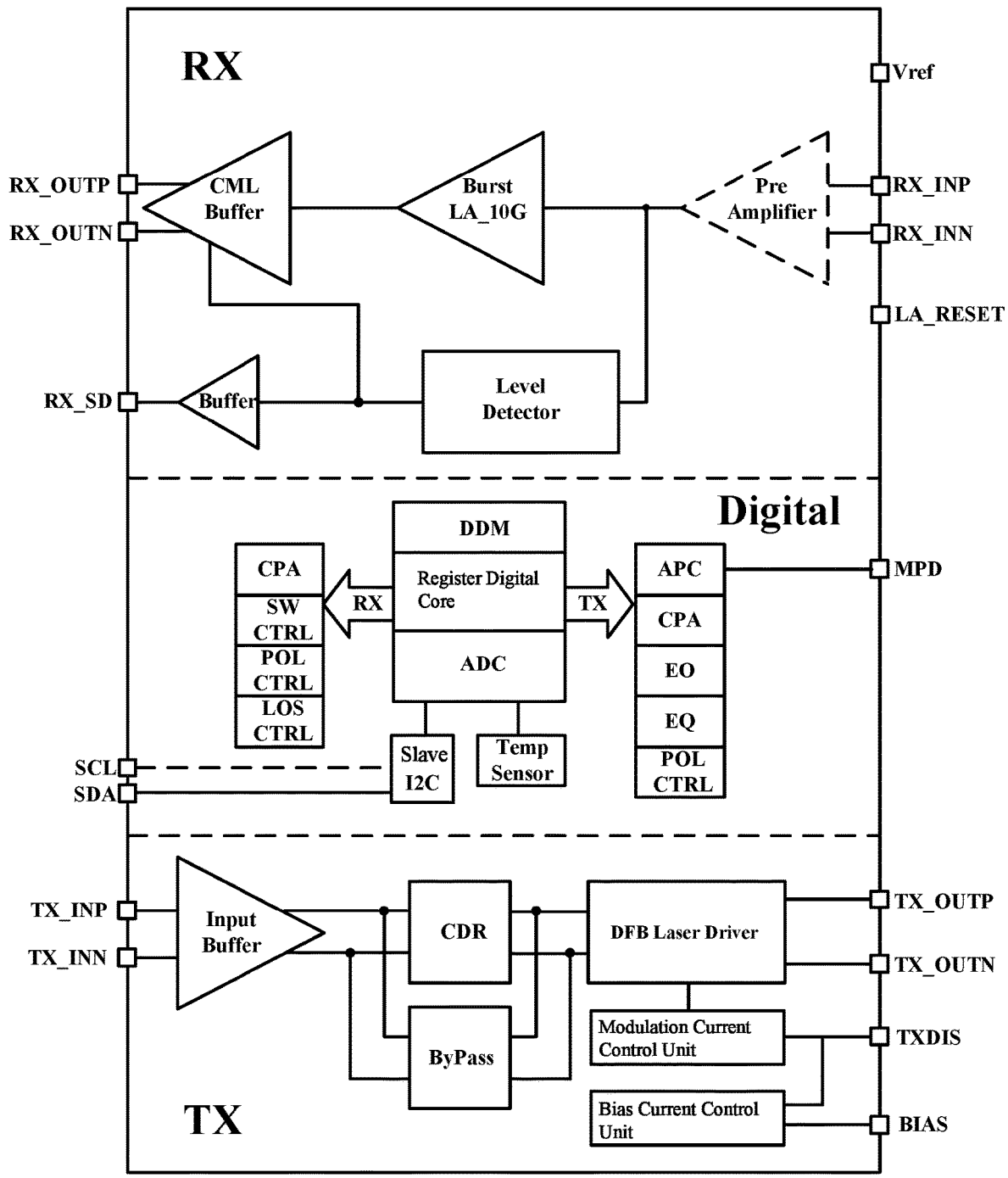
FIG. 2 is a structural schematic diagram of a 10G rate OLT terminal transceiver integrated chip based on XGSPON and DFB laser of FIG. 1 according to the present invention.

Referring to FIG. 1 and FIG. 2 of the drawings, the fast recovery module is external to the burst mode receiver RX. The fast recovery module comprises resistors R7, R8, R9, R10, and switches S1, S2; a non-inverting output terminal of the burst transimpedance amplifier TIA is connected to one end of the resistor R10 of the fast recovery module, one end of the resistor R8 of the fast recovery module and a non-inverting input pin RX_INP of the chip through an AC coupling capacitor C9;

an inverting output terminal of the burst transimpedance amplifier TIA is connected to one end of the resistor R9 and one end of the resistor R7 of the fast recovery module, and an inverting input pin RX_INN of the chip through the AC coupling capacitor C8;

a non-inverting input pin RX_INP of the chip and an inverting input pin RX_INN of the chip are connected to a non-inverting input terminal and an inverting input terminal of the pre-amplifier Pre_Amplifier respectively;

another end of the resistor R10 is connected to one end of the switch S1;

another end of the resistor R9 is connected to one end of the switch S2;

control ends of the switches S1 and S2 are connected to a reset signal line LA_RESET simultaneously; and a reference voltage pin Vref of the burst mode receiver RX is simultaneously connected to another end of the resistor R7, another end of the R8, another end of the switch S1 and another end of the switch S2.

Figure 3:
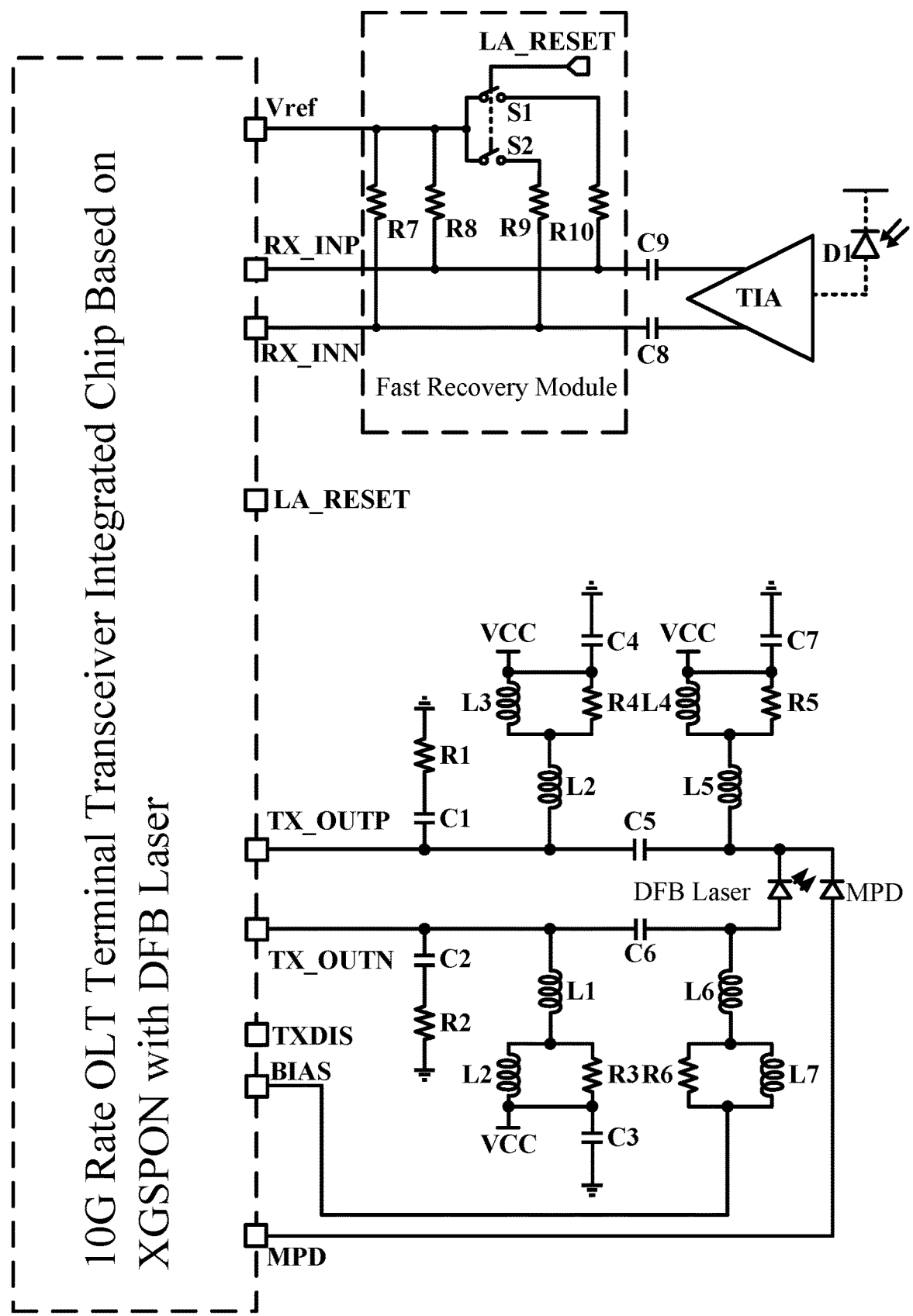
FIG. 3 is a schematic diagram based on XGSPON with DFB laser, and an internal fast recovery circuit according to the present invention.
Figure 4:
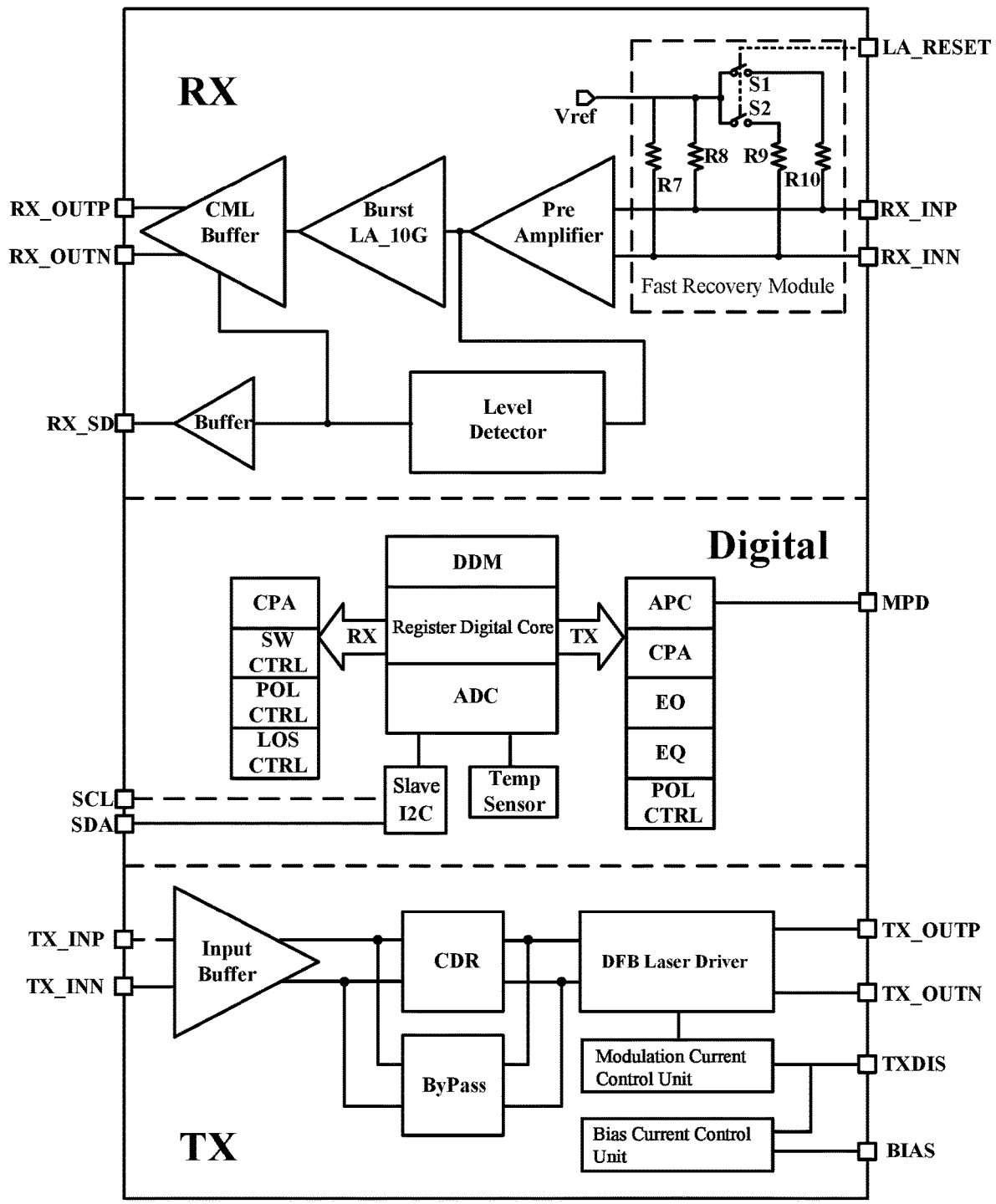
FIG. 4 is a structural schematic diagram of a 10G rate OLT terminal transceiver integrated chip based on XGSPON and DFB laser of FIG. 3 according to the present invention.

Referring to FIG. 3 and FIG. 4 of the drawings, the fast recovery module is built in the burst mode receiver RX. The fast recovery module comprises resistors R7, R8, R9, R10, and switches S1, S2; a non-inverting output terminal and an inverting output terminal of the burst transimpedance amplifier TIA are connected to a non-inverting input pin RX_INP and an inverting input pin RX_INN of the chip through an AC coupling capacitor C9 and C8;

inside the chip, the non-inverting input pin RX_INP of the chip is connected to one end of the resistor R10, one end of the resistor R8 and the non-inverting input terminal of the pre-amplifier Pre_Amplifier;

the inverting input pin RX_INN of the chip is connected to one end of the resistor R9, one end of the resistor R7 and the inverting input of the pre-amplifier Pre_Amplifier;

another end of the resistor R10 is connected to one end of the switch S1;

another end of the resistor R9 is connected to one end of the switch S2;

control ends of the switches S1 and S2 are connected to a reset signal line LA_RESET of the chip simultaneously;

a reference voltage Vref of the burst mode receiver RX is simultaneously connected to another end of the resistor R7, another end of the R8, another end of the switch S1 and another end of the switch S2.

When the built-in configuration is used, the fast recovery module is built into the transceiver integrated chip, which has the advantage of reducing the footprint of the peripheral circuit and saving costs.

The working principles of the burst mode receiver RX: The OLT transceiver integrated chip located in the central office corresponds to multiple ONUs at the user end, therefore the receiving terminal RX of the OLT transceiver integrated chip needs to receive bursts of electrical signals of different amplitudes from the ONU terminal (burst TIA has converted optical signals of different amplitudes into electrical signals and then sent them to the limiting amplifier LA of RX). The pre-amplifier Pre-Amplifier enhances (pre-emphasizes) the attenuated electrical signal output by the upper TIA, and then divides the electrical signal into two paths. One of the path is passing to the LA_10G limiting amplifier to amplify the signal to the limited state. In order to achieve the 10G rate, the 10G limiting amplifier requires a variety of methods to increase the rate bandwidth: such as inductive peaking, capacitor degeneracy, or using bipolar transistors with high cut-off frequencies at key signal path nodes. The other path is passing to the signal detection module (level detector Level Detector). The module detects the amplitude of the signal (in order to meet the XGSPON protocol, the chip is simplified and rate detection, which is difficult to design, is not processed). Only when the amplitude meets the threshold requirement, the signal detection module outputs a command to turn on the output driver stage CML Buffer, and at the same time transmits the judgment result to the host which is external to the chip (through the RX_SD pin). In order to meet the strict timing sequence requirement protocol of XGSPON, a fast recovery circuit must be added in the RX part, so that after the burst LA completes the reception of a data packet, it can immediately return to the normal state, and then continue to receive the next burst data packet such that the physical collision of two adjacent data packets can be avoided.

The chip pin Vref provides a DC operating point for the two input terminals of LA, and also discharges the charge of the capacitors C8 and C9 which are connected to the two input terminals of LA. When the reset signal LA_RESET is 0, the switches S1 and S2 are turned off, and the charges on the capacitor is slowly discharged to the ground through the resistor R7=R8 (large resistance value). When the reset signal LA_RESET is 1, the switches S1 and S2 are turned on, and the charges on the capacitor is quickly discharged to the ground through the resistor R9=R10 (small resistance value) so as to achieve the quickly rebuilding of the DC operating point. By adjusting the resistance of resistors R7, R8, R9, R10, the performance requirements and timing sequence requirements of RX are met. The voltage value of Vref can be artificially set through the two communication signal lines of the digital part. The reset signal LA_RESET is given by the host.

The continuous mode transmitter TX comprises an input buffer Input Buffer, a bypass ByPass, a clock data recovery CDR, a DFB laser driver, a bias current control unit and a modulation current control unit, one of the bypass ByPass or the clock data recovery CDR path is selected to activate;

an attenuated signal formed by an original high-speed electrical signal passing through a metal trace on a PCB is connected to the input buffer Input Buffer through the chip pins TX_INP and TX_INN, then the input buffer Input Buffer transmits the attenuated signal to the input terminal of the DFB laser driver along the activated path;

a bias current output terminal of the bias current control unit is connected to the chip pin BIAS, and provides a bias current for the DFB laser;

a modulation current output terminal of the modulation current control unit is connected to a modulation current input terminal of the DFB laser driver;

an output terminal of the DFB laser driver is connected to the chip pins TX_OUTP and TX_OUTN, and the DFB laser driver provides modulation current for the DFB laser;

the host sends commands to the chip to turn off the bias current and the modulation current through the chip pin TXDIS to turn off the continuous mode transmitter TX.

The activation of one of the bypass ByPass or the clock data recovery CDR path is controlled by digital control unit Digital according to an external command.

The activation of one of the bypass ByPass or the clock data recovery CDR path is controlled through the host automatically switching the channel by itself, when the rate is below 8G, the signal attenuation is not serious, and the bypass ByPass is activated; when the rate is 8G-14G, the signal attenuation is serious, and the clock data recovery CDR path is activated under the control of the host.

The working principles of continuous mode transmitter TX: The TX part of the main channel is capable of receiving and processing continuous electrical signal data streams with a rate of 1-14 Gbps. The original high-speed electrical signal is attenuated after passing through the metal traces on the PCB, resulting in signal errors. In order to solve the problem of high-speed signal attenuation, CDR (clock data recovery) is added inside the TX to improve the quality of high-speed signal. If the attenuation of the high-speed signal is not serious, it can also be transmitted directly from the ByPass path. DFB type lasers support long-distance (>10 km) data transmission, so TX needs to provide a driver with high output current 10G DFB DRIVER. The bias current Bias and modulation current Modulation of the laser need to adjust the current in real time according to the ambient temperature, the luminous efficiency of the laser, and the aging of the laser.

Therefore, the Current Control module cooperates with the APC optical power control module to feed back the laser luminous power information collected by the monitoring photodiode MPD, and configure a reasonable current value through the data writing of the digital part.

The activation of one of the bypass ByPass or the clock data recovery CDR path includes the following two configurations:

Type 1: Pre-judgment, and then write the external command into the digital control unit Digital through the SAD pin according to the judgment result, and the digital control unit Digital sends the selection command to the TX. Pre-judgment refers to the selection of the bypass ByPass path or the clock data recovery CDR path, which is judged based on the attenuation of the signal measured by the chip. Before using the chip, first detect the attenuated signal generated after passing through the metal wiring on the PCB board, and check whether the quality of the TX output eye diagram meets the protocol standard. If it meets the standard, it will be transmitted from bypass ByPass, and if it does not meet the standard, CDR will be turned on to optimize the signal quality.

Type 2: The host switches channels by itself. When the rate is below 8G, the signal attenuation is not serious, and ByPass is activated; when the rate is 8G-14G, the signal attenuation is serious, and the host controls the clock data recovery CDR path to optimize signal quality.

The digital control unit Digital comprises a register digital core, an analog-to-digital converter ADC, a I²C slave and temperature sensor Temp Sensor;

an output terminal of the temperature sensor Temp Sensor is connected to a temperature signal input terminal of the register digital core through the analog-to-digital converter ADC;

an input terminal of I²C slave is connected to a pin SCL of a clock chip; an input and output ports of I²C slave are connected to a pin SDA of an external command chip; an output terminal of I²C slave is connected to an external command input terminal of the register digital core, and the register digital core controls a path selection of the continuous mode transmitter TX; the register digital core also realizes a configuration of the burst mode receiver RX and the continuous mode transmitter TX through a control port.

The control port of the burst mode receiver RX in the digital control unit Digital comprises an eye cross point adjustment control port CPA, an output swing control port SW CTRL, an output polarity inversion control port POL CTRL, and a signal loss control port LOS CTRL.

The control port of the continuous mode transmitter TX in the digital control unit Digital comprises an optical power control port APC, an eye cross point adjustment control port CPA, a jitter optimization control port EQ, an eye diagram optimization control port EO and an output polarity inversion control port POL CTRL;

an input terminal of the optical power control port APC is connected to a chip pin MPD for monitoring current.

The working principle of the digital control unit Digital: The digital control unit Digital can complete the internal configuration of the burst mode receiver RX and the continuous mode transmitter TX.

The functions configurable in the burst mode receiver RX are:

eye diagram cross point adjustment CPA, output swing control SW_CTRL, output polarity inversion POL_CTRL, signal loss threshold setting and mode selection LOS_CTRL, etc.

The configurable functions in the continuous mode transmitter TX are:

laser optical power control APC, eye diagram intersection optimization CPA, jitter optimization EQ, eye diagram optimization EO, output polarity inversion POL_CTRL, etc.

The built-in high-precision multi-bit ADC converts the ambient temperature collected by the temperature sensor Temp Sensor into a digital value and then reads it to the outside through the I²C slave data signal line SDA. ADC can also read other quantifiable data to the outside through I²C slave, such as monitoring current value, bias current value, modulation current value, etc. Users can also write digital quantities to the register digital core inside the chip through the master I²C outside the chip to optimize the transmission performance of the integrated transceiver chip.

The digital control unit also adds a digital diagnostics monitoring (DDM) function to monitor light level, chip temperature, power supply voltage and other data in real time.

According to the present invention, the 10G rate OLT terminal transceiver integrated chip based on XGSPON and DFB laser uses amplitude detection at the 10G burst receiving terminal RX to simultaneously judge whether the input signal meets the requirements of the transmission protocol, and can have a built-in or external fast recovery circuit, which can allow the AC coupling capacitor to quickly discharge the charge and establish a stable working point for the next data packet reception. A high-speed clock data recovery unit CDR is built in the 10G continuous transmitting terminal TX to ensure the integrity of the electrical signal to be transmitted, which is conducive to the laser emitting high-quality light. In order to drive long-distance high-speed DFB lasers, the built-in high-speed laser driver cooperates with the bias current and modulation current modules to output large current. In the digital control unit, there are built-in multi-bit registers, high-precision ADC and I²C slave. All kinds of key data are transmitted to the outside through the SDA signal line, and the digital quantities of related modules with optimized performance can also be written through this line to ensure the high quality of the receiving signal and sending model of the transceiver integrated chip. The DDM module reads the key working information in the chip in real time, and when the threshold is exceeded, the integrated transceiver chip can be turned off to avoid damage to the chip and laser.

Although the present invention is described herein with reference to specific embodiments, it should be understood that these embodiments are merely illustrative of the principles and applications of the present invention. It is therefore to be understood that numerous modifications may be made to the exemplary embodiments and that other arrangements may be devised without departing from the spirit and scope of the present invention as defined by the appended claims. It shall be understood that different dependent claims and features described herein may be combined in a different way than that described in the original claims. It should also be appreciated that features described in connection with individual embodiments can be used in other described embodiments.

What is claimed is:

1. A 10G rate OLT terminal transceiver integrated chip based on XGSPON and DFB laser, comprising:
   a burst mode receiver RX, a continuous mode transmitter TX and a digital control unit DIGIITAL,
   wherein an optical signal from each ONU client is processed through a burst transimpedance amplifier TIA into an electrical signal, then the burst-mode receiver RX amplifies the electrical signal, processes amplitude detection of the electrical signal, determines if an amplitude of the electrical signal meets a threshold requirement, and outputs a detection result of the electrical signal to a host, and comprises a fast recovery module to discharge charges in an AC coupling capacitor to achieve multi-packet transmission without mutual interference, thereby meeting the timing sequence requirement of the XGSPON protocol;
   the continuous mode transmitter TX receives the electrical signal attenuated by a PCB board, and in response to a degree of attenuation, selects a bypass path BYPASS for transmission or outputs the electrical signal after a signal quality of the electrical signal is processed and improved by a clock data recovery path CDR to drive the DFB laser; and
   the digital control unit DIGIITAL communicates with the host, and provides control signals for the burst mode receiver RX and the continuous mode transmitter TX.

2. The 10G rate OLT terminal transceiver integrated chip based on XGSPON and DFB laser according to claim 1, wherein the burst mode receiver RX comprises a pre-amplifier Pre_Amplifier, a level detector LEVEL DETECTOR, a 10G burst-mode limiting amplifier BurstLA_10G, a current mode logic output buffer CML BUFFER, a signal detection output buffer BUFFER and a fast recovery module,
   a non-inverting input and an inverting input of the pre-amplifier Pre_Amplifier are arranged to receive a burst data packet (the electrical signal) from the burst transimpedance amplifier TIA;
   the fast recovery module is arranged to provide a fast recovery circuit to ensure a timing sequence is correct, so that physical collision of two adjacently time sequenced burst data packets is avoided;
   an output terminal of the pre-amplifier Pre_Amplifier is simultaneously connected to an input terminal of the 10G burst-mode limiting amplifier BurstLA_10G and an input terminal of the level detector LEVEL DETECTOR;
   an output terminal of the 10G burst-mode limiting amplifier BurstLA_10G is connected to an input terminal of the current mode logic output buffer CML BUFFER;
   an output terminal of the level detector LEVEL DETECTOR is simultaneously connected to an input terminal of the signal detection output buffer BUFFER and an on/off control terminal of the current mode logic output buffer CML BUFFER;
   two output terminals of the current mode logic output buffer CML BUFFER are connected to output pins RX_OUTP and RX_OUTN of the burst mode receiver RX respectively;
   an output terminal of the signal detection output buffer BUFFER is connected to a chip pin RX_SD, and the burst mode receiver RX sends an amplitude detection result to the host through the chip pin RX_SD;
   wherein in response to a reset signal sent by a chip pin LA_RESET from the host, the chip sends a feedback signal to the host through the pin RX_SD.

3. The 10G rate OLT terminal transceiver integrated chip based on XGSPON and DFB laser according to claim 2, wherein the fast recovery module is built-in or external to the burst mode receiver RX, and the fast recovery module includes resistors R7, R8, R9, R10, and switches S1 and S2,
   when the fast recovery module is external to the burst mode receiver RX, a non-inverting output terminal of the burst transimpedance amplifier TIA is connected to one end of the resistor R10 of the fast recovery module, one end of the resistor R8 and a non-inverting input pin RX_INP of the chip through an AC coupling capacitor C9;
   an inverting output terminal of the burst transimpedance amplifier TIA is connected to one end of the resistor R9 and one end of the resistor R7 of the fast recovery module, and an inverting input pin RX_INN of the chip through the AC coupling capacitor C8;
   a non-inverting input pin RX_INP of the chip and an inverting input pin RX_INN of the chip are connected to a non-inverting input terminal and an inverting input terminal of the pre-amplifier Pre_Amplifier respectively;
   another end of the resistor R10 is connected to one end of the switch S1;
   another end of the resistor R9 is connected to one end of the switch S2;
   control ends of the switches S1 and S2 are connected to a reset signal line LA_RESET simultaneously; and
   a reference voltage pin Vref of the burst mode receiver RX is simultaneously connected to another end of the resistor R7, another end of the R8, another end of the switch S1 and another end of the switch S2,
   when the fast recovery module is built in the burst mode receiver RX, a non-inverting output terminal and an inverting output terminal of the burst transimpedance amplifier TIA are connected to a non-inverting input pin RX_INP and an inverting input pin RX_INN of the chip through AC coupling capacitors C9 and C8;
   inside the chip, the non-inverting input pin RX_INP of the chip is connected to one end of the resistor R10, one end of the resistor R8 and a non-inverting input terminal of the pre-amplifier Pre_Amplifier;
   the inverting input pin RX_INN of the chip is connected to one end of the resistor R9, one end of the resistor R7 and an inverting input of the pre-amplifier Pre_Amplifier;
   another end of the resistor R10 is connected to one end of the switch S1;
   another end of the resistor R9 is connected to one end of the switch S2;
   control ends of the switches S1 and S2 are connected to a reset signal line LA_RESET of the chip simultaneously; and
   a reference voltage Vref of the burst mode receiver RX is simultaneously connected to another end of the resistor R7, another end of the R8, another end of the switch S1 and another end of the switch S2.

4. The 10G rate OLT terminal transceiver integrated chip based on XGSPON and DFB laser according to claim 1, wherein the continuous mode transmitter TX comprises an input buffer INPUT BUFFER, the bypass ByPass, the clock data recovery CDR, the DFB laser driver, a bias current control unit and a modulation current control unit,
   wherein one of the bypass ByPass or the clock data recovery CDR path is selected to activate,
   an attenuated signal formed by an original high-speed electrical signal (the burst data packet) passing through a metal trace on the PCB board is connected to the input buffer INPUT BUFFER through the chip pins TX_INP and TX_INN, then the input buffer INPUT BUFFER transmits the attenuated signal to the input terminal of the DFB laser driver along the activated path;

a bias current output terminal of the bias current control unit is connected to the chip pin BIAS, and provides a bias current for the DFB laser;

a modulation current output terminal of the modulation current control unit is connected to a modulation current input terminal of the DFB laser driver;

an output terminal of the DFB laser driver is connected to chip pins TX_OUTP and TX_OUTN, and the DFB laser driver provides modulation current for the DFB laser;

the host sends commands to the chip to turn off the bias current and the modulation current through the chip pin TXDIS to turn off the continuous mode transmitter TX.

5. The 10G rate OLT terminal transceiver integrated chip based on XGSPON and DFB laser according to claim 4, wherein the activation of one of the bypass ByPass or the clock data recovery CDR path is controlled by digital control unit DIGITAL according to an external command.

6. The 10G rate OLT terminal transceiver integrated chip based on XGSPON and DFB laser according to claim 4, wherein the activation of one of the bypass ByPass path or the clock data recovery CDR path is controlled by the host switching a channel by itself, if a detected rate of the original high-speed electrical signal is below 8G, the signal attenuation is not serious, and the bypass ByPass path is activated; if the detected rate of the original high-speed electrical signal is 8G-14G, the signal attenuation is serious, and the clock data recovery CDR path is activated by the host.

7. The 10G rate OLT terminal transceiver integrated chip based on XGSPON and DFB laser according to claim 4, the digital control unit DIGITAL comprises a register digital core, an analog-to-digital converter ADC, a I²C slave and temperature sensor TEMP SENSOR;

an output terminal of the temperature sensor TEMP SENSOR is connected to a temperature signal input terminal of the register digital core through the analog-to-digital converter ADC;

an input terminal of I²C slave is connected to a pin SCL of a clock chip; an input and output ports of I²C slave are connected to a pin SDA of an external command chip; an output terminal of I²C slave is connected to an external command input terminal of the register digital core, and the register digital core controls a path activation of the continuous mode transmitter TX; the register digital core also realizes a configuration of the burst mode receiver RX and the continuous mode transmitter TX through a control port.

8. The 10G rate OLT terminal transceiver integrated chip based on XGSPON and DFB laser according to claim 7, wherein the control port for configuring the burst mode receiver RX in the digital control unit Digital comprises an eye cross point adjustment control port CPA, an output swing control port SW CTRL, an output polarity inversion control port POL CTRL, and a signal loss control port LOS CTRL.

9. The 10G rate OLT terminal transceiver integrated chip based on XGSPON and DFB laser according to claim 7, wherein the control port for configuring the continuous mode transmitter TX in the digital control unit Digital comprises an optical power control port APC, an eye cross point adjustment control port CPA, a jitter optimization control port EQ, an eye diagram optimization control port EO and an output polarity inversion control port POL CTRL; and an input terminal of the optical power control port APC is connected to a chip pin MPD for monitoring current.

* * * * *